(No Model.)

J. E. PRUNTY.
FIRE EXTINGUISHING APPARATUS.

No. 447,476. Patented Mar. 3, 1891.

UNITED STATES PATENT OFFICE.

JOHN E. PRUNTY, OF BALTIMORE, MARYLAND, ASSIGNOR TO GREENE & PRUNTY.

FIRE-EXTINGUISHING APPARATUS.

SPECIFICATION forming part of Letters Patent No. 447,476, dated March 3, 1891.

Application filed July 12, 1890. Serial No. 358,516. (No model.)

*To all whom it may concern:*

Be it known that I, JOHN E. PRUNTY, of the city of Baltimore and State of Maryland, have invented certain new and useful Improvements in Fire-Extinguishing Apparatus, of which the following is a full and complete specification, reference being had to the accompanying drawings, in which similar figures of reference indicate similar parts.

Figure 1:
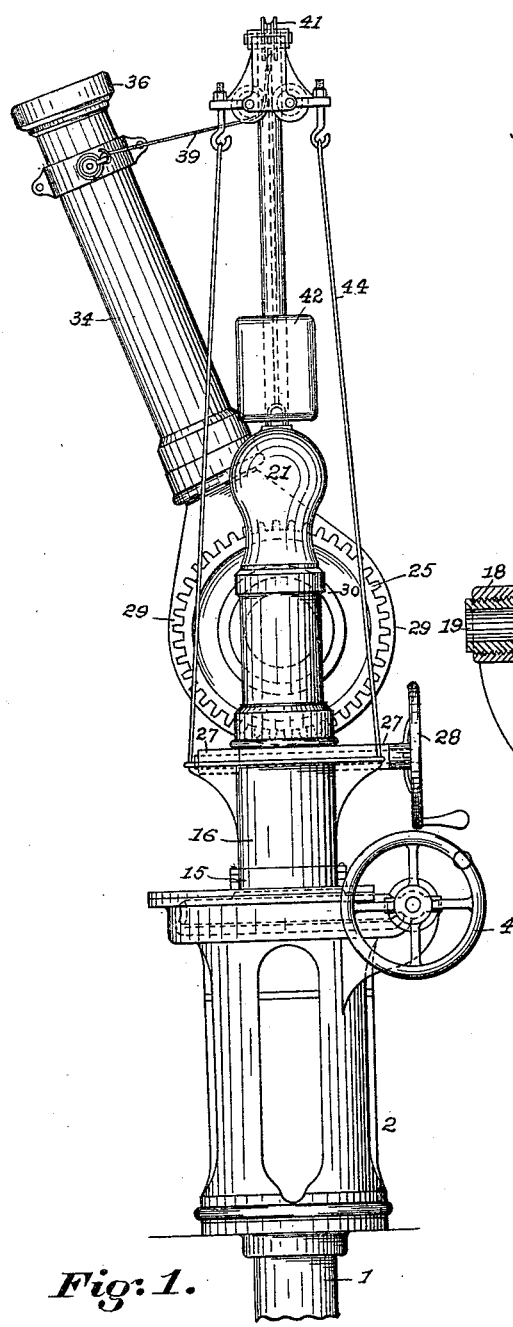
Figure 2:
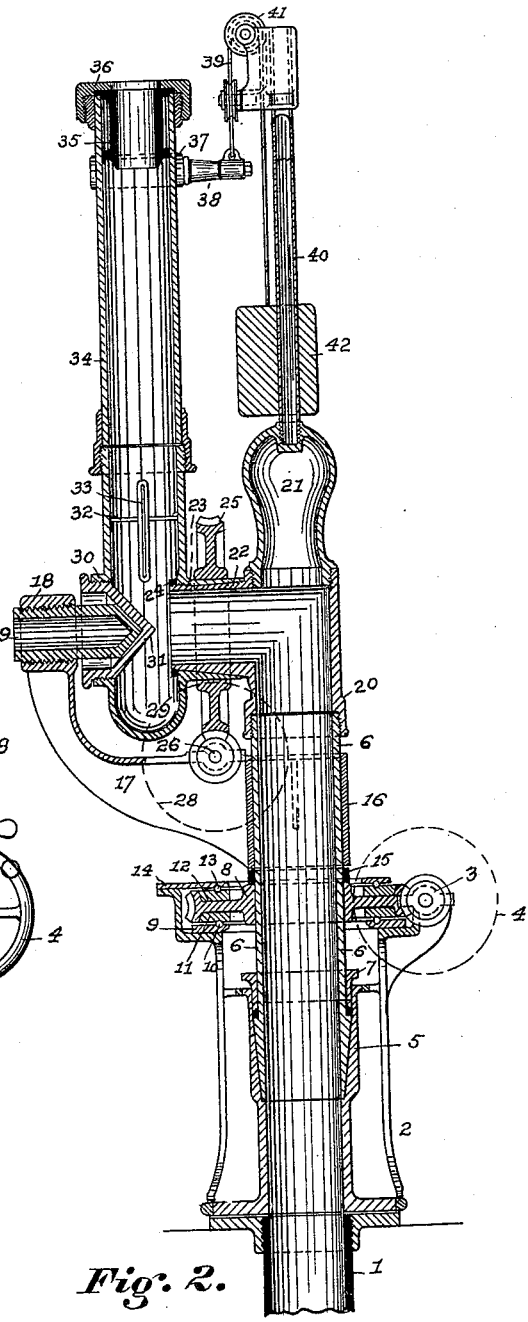

In the drawings, Figure 1 is a front elevation of my apparatus. Fig. 2 is a sectional view of the same, the movable part being turned to an angle of ninety degrees with its position in Fig. 1.

My invention relates to that class of apparatus which is employed to throw water upon a fire, and this particular structure is intended for use upon a fire-boat, the object being to throw a very large stream of water. It will be readily seen that the same structure may be employed for any other purpose than extinguishing fires to which it may be applicable.

It is essential in apparatus for throwing water to a distance that the turning of the nozzle from a straight line to a curved one and from one direction to another should develop no reaction, or as little as possible, so as to avoid the difficulty of handling a hose or the possibility of its overturning anything to which it is attached. This I accomplish by interposing in the path of the stream a distributing-chamber provided with a cone, the center of which is the center of the stream of water as it enters the chamber. As the stream strikes it the water is distributed in all directions, exerting counterbalancing retractive forces upon the apparatus. The distributed water is caught by a circular chamber and finds an outlet by the nozzle which is connected to the chamber.

In the drawings, 1 represents the supply-pipe by which water is delivered from the pump.

2 is the stand of the nozzle apparatus, which is bolted to the deck of the vessel, and which consists of a central pipe surrounded by a frame.

3 is a worm journaled on one side of the stand, and to the shaft of which is secured a hand-wheel 4, by which it may be turned.

5 is a conical socket on the upper end of the pipe, which is in the center of the stand.

6 is a section of pipe of the same size of the pump-pipe and that of the stand, and is provided on its lower end with a conical portion which fits and is ground to a joint in the conical socket 5 of the stand-pipe.

7 is a gland surrounding the pipe 6 and fitting into the upper end of the socket 5, below which there is packing, so as to make a water-tight joint. The lower end of the pipe 6 is fitted into the socket 5 until it makes a bearing in the bottom of the socket.

8 is a worm-wheel keyed to the pipe 6 and meshing with the worm 3, by which it is turned, while it turns the pipe 6 and the apparatus connected to it.

9 is the circular plate secured upon stand 2 and surrounding the pipe 6. In the upper surface of this plate is cut a circular groove, the center of the circle of which is the axis of the pipe 6. In this groove rest a series of balls 10 10 10, &c.

To the under side of the worm-wheel 8 is secured a plate 11, similar to 9, and having a similar groove upon its under side, which rests upon the top of the balls 10, and forms with them an anti-friction bearing for the worm-wheel to turn upon, and upon which is sustained the whole weight of the apparatus. A similar anti-friction bearing is constructed above the worm-wheel. A plate 12 is secured to wheel 8, having a groove in which rests a series of balls 13 13, and above this a plate 14, secured to the stand and resting upon the top of the balls. It will thus be seen that there is an anti-friction bearing above and below the worm-wheel to receive any pressure that may be exerted through said wheel, either by direct action of weight or by twisting or tendency to upset which may occur in the apparatus.

15 is a ring keyed to the pipe 6, and which may be altered in thickness to maintain other parts in proper relation to one another, and which is made in two halves hinged together so that it may be taken off and the whole upper structure lowered to separate gears.

16 is a sleeve surrounding the pipe 6, and to one side of which is secured an arm 17, upon the end of which is an eye 18, through which is screwed a plug, rod, or cylinder having a point on the inner end, and which forms a back-bearing for the revolving nozzle.

20 is a right angle elbow screwed to the top of the pipe 6, the horizontal portion of which is beveled to form the inner part 22 of a long conical bearing. Upon the exterior of this cone 22 is fitted a conical socket 23, which is an extension from the side of the distributing-chamber 29. The cone 22, which forms the inner portion of this ground joint, extends beyond the inner wall of the distributing-chamber, and upon the end of it is secured a ring 24, by which the external portion of the conical joint is held in place.

To the exterior of the sleeve 23 is keyed the worm-wheel 25, which meshes with the worm 26, which is mounted in the bearings 27, and provided on its end with a hand-wheel 28, by which the worm and worm-wheel are turned.

29 is a circular distributing-chamber at the base of the nozzle, and into the center of one of the side walls of which the water-inlet pipe enters. The chamber is flat and of about the same depth as the diameter of the inlet-pipe, but of much greater diameter, and it may be made of different proportions, if desired. In the opposite walls of the distributing-chamber are two apertures, one connected to the water-inlet and the other (marked 30) somewhat larger than the inlet and large enough to permit the ring 24 to pass through it. In this aperture is screwed a plug 31, which is in the form of a cone and projects into the center of the distributing-chamber, and the apex of which stands opposite the center of the inlet-pipe. In the rear side of the plug 31 is a conical socket, into which the conical end of the bearing-pin 19 fits and forms a back-bearing for the revolving nozzle.

The distributing-chamber, although generally circular in form, has its walls drawn out and contracted at one point until they terminate in a circular opening, to which the nozzle is screwed.

Across the contracted portion of the distributing-chamber and below the mouth is a baffle-plate 32, which operates to resist the flow of the water from the cone at that point and approximately balance the pressure at all points within the distributing-chamber. 33 33 are wings or blades, secured to the interior walls of the neck of the distributing-chamber and projecting toward the center for the purpose of taking the twist out of the water and causing it to flow straight to the nozzle.

The nozzle 34 consists of a straight pipe of the same diameter as the other pipes of the device. In the end of the nozzle 34 is fitted a mouth-piece 35, which is of considerably less diameter than the nozzle-pipe. The interior walls of the mouth-piece are parallel, and the lower end is provided with a sharp edge, inclined backward, so as to catch the water between the wall of the nozzle and the lower edge of the mouth-piece.

36 is a cap, which is screwed upon the end of the nozzle and holds the mouth-piece in place.

The purpose of this form of mouth-piece is that the water in the nozzle against the walls will be somewhat retarded in its flow by friction, and the sudden checking of its flow at the base of the mouth-piece will so retard it as to cause the water from the center of the nozzle to flow out through the nozzle, having the water next the walls comparatively still. The result of this action will be that the stream of water will flow through the center of a cylinder of water and avoid the friction of the walls of the nozzle.

37 is a strap encircling the nozzle near its mouth, to which is secured a post 38, to the end of which is fastened a rope 39.

40 is a post screwed into a socket in the top of the dome 21. To the top of this post is secured a frame, in which is mounted a sheave 41, over which passes the cord 39, and to the other end of said cord is secured the counter-balance-weight 42, by which the weight of the nozzle is counter-balanced.

43 43 are sheaves on either side of the cord 39, so as to receive the cord when the nozzle is thrown to one side or the other.

44 44 are guys, secured to either side of the frame, in which the sheaves 41, 43, and 43 are mounted at one end and to either side of the arm 17 at the other.

The operation of the device is as follows: Water enters from the pump through the pipe 1, passes up through the stand-pipe into pipe 6, meets air in dome, compresses it, and is driven back, turns in elbow, strikes upon the apex of the cord 31, and is thrown equally in all directions, exerting equal reactionary forces in all, which balance one another and entirely destroy the general reactionary force of the current upon the apparatus. This equal distribution taking place to the same extent at all times and acting equally in all directions, the nozzle may be placed at any angle or in any direction without changing the general reactionary influence of the current. The blades inside of throat of distributing-chamber direct the water in a straight line and cause it to flow straight to the nozzle. The mouth-piece retards the water at the walls, while allowing the center water to flow through, thus eliminating in great measure the friction of the walls of the nozzle.

When it is desired to change the direction of the stream, the apparatus may be operated with great ease by means of the hand-wheels 4 and 28, the former revolving the device on a vertical axis, while the latter revolves a portion of it on a horizontal axis.

Having described my invention, what I desire to claim is—

1. In a fire-extinguishing apparatus, the combination of a stand-pipe connected to a supply of water and provided with a conical joint to permit the upper part to turn, a gear-wheel keyed to the upper movable portion of said pipe and sustained upon an anti-friction bearing, and means co-operating with said gear whereby the movable portion of said stand-pipe may be revolved upon a vertical axis, substantially as described.

2. In a fire-extinguishing apparatus, the combination of a stand-pipe connected to a supply of water and provided with a conical joint to permit the upper part to turn, a gear-wheel keyed to the upper movable portion of said pipe and sustained upon an anti-friction bearing, and means co-operating with said gear whereby the movable portion of said stand-pipe may be revolved upon a vertical axis, the upper end of the stand-pipe being provided with a right-angle elbow, and a nozzle, the lower end of which is provided with a distributing-chamber, into one side of which the elbow of the stand-pipe enters, and which is connected with the elbow by a conical joint, which will permit the nozzle to move upon the elbow, substantially as described.

3. In a fire-extinguishing apparatus, the combination of a supply-pipe with a nozzle provided at its lower end with a distributing-chamber circular in form and of much greater diameter than the supply-pipe, having in one side an aperture for the admission of water, at which point the chamber is secured to the supply-pipe, and having on the side opposite the water-inlet a cone the apex of which projects into the chamber in line with the center of the opposite aperture.

4. In a fire-extinguishing apparatus, the combination of a supply-pipe with a revoluble nozzle provided on its lower end with a distributing-chamber circular in form and of much greater diameter than the supply-pipe, having in one side an aperture for the admission of water, from which a section of pipe projects, which forms one part of a conical-joint connection with the supply-pipe, a cone which projects into the chamber and the apex of which is in line with the center of the inlet-aperture, and means for revolving the distributing-chamber and nozzle about the supply-pipe, substantially as described.

5. In a fire-extinguishing apparatus, the combination of a supply-pipe with a nozzle, and a distributing-chamber connected to the supply-pipe at one side and provided with a cone on its interior secured to the wall of the chamber opposite the inlet, said distributing-chamber also having blades secured to the interior of the water-way between the distributing-chamber and the nozzle, as and for the purpose specified.

6. In a fire-extinguishing apparatus, the combination of a supply-pipe with a nozzle, and a distributing-chamber connected to the supply-pipe at one side and provided with a cone on its interior secured to the wall of the chamber opposite the inlet, said distributing-chamber also being provided with a baffle-plate secured to its interior and in the path of the stream of water as it leaves the distributing-chamber, as and for the purpose specified.

JOHN E. PRUNTY.

Witnesses:
ARTHUR STEUART,
FELIX R. SULLIVAN.